US008241132B2

(12) United States Patent
Freele

(10) Patent No.: US 8,241,132 B2
(45) Date of Patent: Aug. 14, 2012

(54) GAMING SYSTEM AND A METHOD OF MANAGING USAGE OF GAMING MACHINES

(75) Inventor: Blake Timothy James Freele, Glebe (AU)

(73) Assignee: Aristocrat Technologies Australia Pty Limited (AU)

( * ) Notice: Subject to any disclaimer, the term of this patent is extended or adjusted under 35 U.S.C. 154(b) by 599 days.

(21) Appl. No.: 12/361,390

(22) Filed: Jan. 28, 2009

(65) Prior Publication Data

US 2009/0191973 A1 Jul. 30, 2009

(30) Foreign Application Priority Data

Jan. 29, 2008 (AU) ................................ 2008900385

(51) Int. Cl.
*A63F 13/00* (2006.01)

(52) U.S. Cl. ................ 463/42; 463/29; 463/32; 463/33; 463/34; 463/35

(58) Field of Classification Search ..................... 463/42
See application file for complete search history.

(56) References Cited

U.S. PATENT DOCUMENTS

| | | | | |
|---|---|---|---|---|
| 6,322,451 | B1 | 11/2001 | Miura | |
| 2002/0050683 | A1* | 5/2002 | Hirota | 273/121 B |
| 2003/0022707 | A1* | 1/2003 | Namba et al. | 463/3 |
| 2003/0125107 | A1* | 7/2003 | Cannon | 463/25 |
| 2006/0026425 | A1 | 2/2006 | Douceur et al. | |
| 2006/0058091 | A1* | 3/2006 | Crawford et al. | 463/13 |
| 2006/0264252 | A1* | 11/2006 | White et al. | 463/13 |
| 2007/0045958 | A1* | 3/2007 | Rader et al. | 273/274 |
| 2007/0293293 | A1* | 12/2007 | Baerlocher et al. | 463/16 |
| 2008/0039193 | A1* | 2/2008 | Muir et al. | 463/25 |
| 2008/0070695 | A1* | 3/2008 | Baerlocher et al. | 463/42 |
| 2009/0007186 | A1* | 1/2009 | Hartwell | 725/62 |
| 2009/0104980 | A1* | 4/2009 | Lui et al. | 463/25 |
| 2009/0111568 | A1* | 4/2009 | Okada | 463/20 |
| 2009/0117976 | A1* | 5/2009 | Tsukahara | 463/20 |

FOREIGN PATENT DOCUMENTS

| | | |
|---|---|---|
| CA | 2571127 | 6/2007 |
| DE | 3139585 | 4/1983 |
| DE | 3712475 | 11/1988 |
| DE | 3918203 | 12/1990 |
| DE | 4041077 | 6/1992 |
| EP | 0513386 | 11/1992 |
| GB | 191328400 | 0/1914 |
| GB | 2328060 | 2/1999 |
| GB | 2379615 | 3/2003 |
| JP | 1040076 A | 2/1989 |
| JP | 3247372 | 11/1991 |
| JP | 3254773 A | 11/1991 |
| JP | 4327873 | 11/1992 |

(Continued)

*Primary Examiner* — N Drew Richards
*Assistant Examiner* — Ankush Singal
(74) *Attorney, Agent, or Firm* — McAndrews, Held & Malloy, Ltd.

(57) ABSTRACT

A gaming system is disclosed which comprises a plurality of gaming machines and a communications network arranged to facilitate communications to and from the gaming machines. Each gaming machine is arranged to implement a game, and to generate status information indicative of whether the gaming machine is vacant or occupied, and the system is arranged to display availability information derived from the status information indicative of whether at least some of the gaming machines are vacant or occupied. A corresponding method is also disclosed.

68 Claims, 7 Drawing Sheets

FOREIGN PATENT DOCUMENTS

| | | | | |
|---|---|---|---|---|
| JP | 5003945 | A | | 1/1993 |
| JP | 5084348 | A | | 4/1993 |
| JP | 5168762 | | | 7/1993 |
| JP | 5184724 | | | 7/1993 |
| JP | 7068032 | A | | 3/1995 |
| JP | 7136327 | | | 5/1995 |
| JP | 7185100 | | | 7/1995 |
| JP | 8057119 | | | 3/1996 |
| JP | 8164259 | | | 6/1996 |
| JP | 8229198 | | | 9/1996 |
| JP | 8252359 | | | 10/1996 |
| JP | 8294573 | | | 11/1996 |
| JP | 9239133 | | | 9/1997 |
| JP | 10156010 | | | 6/1998 |
| JP | 10156032 | | | 6/1998 |
| JP | 10165626 | | | 6/1998 |
| JP | 10323440 | | | 12/1998 |
| JP | 11076579 | | | 3/1999 |
| JP | 11290522 | | | 10/1999 |
| JP | 2000126389 | A | | 5/2000 |
| JP | 2000233075 | A | | 8/2000 |
| JP | 2001087542 | | | 4/2001 |
| JP | 2001129210 | A | | 5/2001 |
| JP | 2001224772 | A | | 8/2001 |
| JP | 2002066112 | | | 3/2002 |
| JP | 2002177587 | | | 6/2002 |
| JP | 2002306777 | A | | 10/2002 |
| JP | 2002306819 | | | 10/2002 |
| JP | 2002315934 | | | 10/2002 |
| JP | 2003038796 | | | 2/2003 |
| JP | 2003079820 | | | 3/2003 |
| JP | 2003175225 | A | | 6/2003 |
| JP | 2003284844 | A | | 10/2003 |
| JP | 2004016674 | A | | 1/2004 |
| JP | 2004049390 | | | 2/2004 |
| JP | 2004057222 | | | 2/2004 |
| JP | 2004097684 | | | 4/2004 |
| JP | 2004160009 | A | | 6/2004 |
| JP | 2004160265 | A | | 6/2004 |
| JP | 2004208778 | A | | 7/2004 |
| JP | 2004267267 | A | | 9/2004 |
| JP | 2004267792 | A | | 9/2004 |
| JP | 2004275353 | A | | 10/2004 |
| JP | 2005046402 | | | 2/2005 |
| JP | 2005058607 | | | 3/2005 |
| JP | 2005087413 | | | 4/2005 |
| JP | 2005111010 | | | 4/2005 |
| JP | 2005111128 | | | 4/2005 |
| JP | 2005124607 | | | 5/2005 |
| JP | 2005296225 | A | | 10/2005 |
| JP | 2005296226 | A | | 10/2005 |
| JP | 2006055553 | | | 3/2006 |
| JP | 2006109973 | A | | 4/2006 |
| JP | 2006158553 | A | | 6/2006 |
| JP | 2006174911 | A | * | 7/2006 |
| JP | 2006289131 | A | | 10/2006 |
| JP | 2006289132 | | | 10/2006 |
| JP | 2006289133 | | | 10/2006 |
| JP | 2006289134 | | | 10/2006 |
| JP | 2006289135 | | | 10/2006 |
| JP | 2006289136 | | | 10/2006 |
| JP | 2006334248 | | | 12/2006 |
| JP | 2007007082 | | | 1/2007 |
| KR | 20030041374 | | | 5/2003 |

* cited by examiner

GAMING SYSTEM AND A METHOD OF MANAGING USAGE OF GAMING MACHINES

RELATED APPLICATIONS

This application claims priority to Australian Patent Application No. 2008900385, having a filing date of Jan. 29, 2008, which is incorporated herein by reference in its entirety.

FEDERALLY SPONSORED RESEARCH OR DEVELOPMENT

Not Applicable

MICROFICHE/COPYRIGHT REFERENCE

Not Applicable

FIELD OF THE INVENTION

The present invention relates to a gaming system and to a method of managing usage of gaming machines.

BACKGROUND OF THE INVENTION

It is known to provide a gaming venue with a plurality of player operable gaming machines which may be stand alone or connected together in a network. Generally, the gaming machines implement several different types of games in order to accommodate differing preferences of game players.

However, with this type of gaming system, it is often difficult for a player to find a gaming machine of interest which is available.

BRIEF SUMMARY OF THE INVENTION

In accordance with a first aspect of the present invention, there is provided a gaming system comprising:

plurality of gaming machines; and a communications network arranged to facilitate communications to and from the gaming machines;

each gaming machine being arranged to implement a game, and to generate status information indicative of whether the gaming machine is vacant or occupied;

the system being arranged to display availability information derived from the status information indicative of whether at least some of the gaming machines are vacant or occupied.

In one embodiment, the availability information is received and displayed at a gaming machine. In an alternative embodiment, the availability information is received and displayed at a display location separate to the gaming machines.

In one embodiment, the gaining system is arranged to generate gaining machine layout information, the layout information being indicative of the locations of the gaming machines relative to each other. The layout information may include the availability information, and in one embodiment the layout information may be displayed on a gaming machine. The layout information may include information indicative of the name of the or each of the games implementable by the gaming machines associated with the gaming system, and/or the denominations associated with the implementable games.

In one embodiment, the availability information is arranged so as to graphically indicate whether a gaining machine is vacant or occupied, for example by representing vacant gaming machines with a first colour such as green and representing occupied gaming machines with a second colour such as red, by causing representations of the occupied gaming machines or the vacant gaining machines to flash, or by including the word “OCCUPIED” or “VACANT” on or adjacent the representations of the gaming machines.

In one arrangement, the gaming system is arranged to receive a game request from a player indicative of a gaming machine or a game desired to be played by the player. The game request may be received in response to player selection of a gaming machine using the layout information, for example using a touch screen.

In one embodiment, each gaming machine is arranged to receive a game request from a player.

In one embodiment, the gaming system is arranged to receive a game request from a game request device separate to the gaining machines.

In one embodiment, the gaming system is arranged to receive a game request from a mobile communications device, such as a mobile phone.

The gaming system may be arranged to generate a machine free notification when the requested gaming machine is vacant using the status information generated by the requested gaming machine.

In one embodiment, the machine free notification is communicated to the gaming machine associated with the game request, and information indicative of the machine free notification is communicated to the player at the gaming machine, for example by displaying a machine free message on a display of the gaming machine.

In one embodiment, information indicative of the machine free notification is communicated to the player by displaying the information at a display location separate to the gaming machines.

In one embodiment, information indicative of the machine free notification is communicated to the player by sending the information to a mobile communications device associated with the player, such as a mobile phone.

The system may be arranged such that the requested game is reserved for play by the player if the player commences game play at the requested gaming machine within a specific period of time.

The gaining system may be arranged to generate an identifier when a machine free notification is generated, the identifier being usable by a requested gaming machine to identify the player associated with the game request and thereby make a requested gaming machine available for game play. The identifier may be communicated to a player by displaying the identifier on a screen, may be stored on a storage medium readable by the requested gaming machine or may be incorporated into or on a ticket readable by the requested gaming machine.

In one embodiment, each gaming machine is arranged to communicate directly with other gaming machines. Each gaming machine may have an associated notification module which may comprise a player marketing module, the notification module being arranged to receive status information from the gaming machines, to generate game request information indicative of a game desired to be played by a player and/or a particular gaming machine desired to be played by a player, and to communicate a machine free notification to a player.

In an alternative embodiment, the gaming system comprises a notification system arranged to communicate with the gaming machines through the communications network, the notification system comprising a game status receiver arranged to receive status information from the gaming machines, and to communicate the status information to the gaming machines.

The notification system may comprise a layout server arranged to generate layout information indicative of the locations of the gaming machines relative to each other, the availability information, and information indicative of the name of the or each of the games implementable by the gaming machines associated with the gaming system, and/or the denominations associated with the implementable games.

The notification system may also comprise a game request receiver arranged to receive game request information indicative of a game desired to be played by a player and/or a particular gaming machine desired to be played by a player, and a notification controller arranged to generate a machine free notification when the requested game and/or gaming machine is available.

In accordance with a second aspect of the present invention, there is provided a gaining system comprising:

a plurality of gaming machines;

a server arranged to cooperate with each gaming machine so as to implement a game; and a communications network arranged to facilitate communications between the gaming machines and the server;

the server being arranged to generate status information indicative of whether the gaming machines are vacant or occupied; and the system being arranged to display availability information derived from the status information indicative of whether at least some of the gaming machines are vacant or occupied.

In accordance with a third aspect of the present invention, there is provided a method of managing usage of gaming machines, the method comprising:

providing a plurality of gaining machines; and enabling communications to and from the gaming machines;

arranging each gaming machine to generate status information indicative of whether the gaming machine is vacant or occupied, and to receive availability information derived from the status information indicative of whether at least some of the other gaming machines are vacant or occupied.

In accordance with a fourth aspect of the present invention, there is provided a gaming machine comprising:

a status determiner arranged to generate status information indicative of whether the gaming machine is vacant or occupied;

a network interface arranged to facilitate communications from the gaming machine;

the gaming machine being arranged to send the status information through the network interface, the status information being usable by a gaming system to generate availability information indicative of whether the gaming machine is vacant or occupied.

In accordance with a fifth aspect of the present invention, there is provided a game server arranged to cooperate with at least one gaming machine so as to implement at least one game, and arranged to facilitate network communications from the game server;

the game server being arranged to generate status information indicative of whether the gaming machines are vacant or occupied; and the status information being usable to generate availability information indicative of whether at least one gaining machine in communication with the game server is vacant or occupied.

In accordance with a sixth aspect of the present invention, there is provided a notification system for a gaming system, said notification system comprising:

a network interface arranged to facilitate communications with at least one networked gaming machine associated with the notification system;

a game status receiver arranged to receive status information indicative of whether the or each gaming machine associated with the notification system is vacant or occupied; and a display arranged to display availability information derived from the status information indicative of whether at least some of the gaming machines associated with the notification system are vacant or occupied.

In accordance with a seventh aspect of the present invention, there is provided a computer program arranged when loaded into a computer to instruct the computer to operate in accordance with a gaming system comprising:

a plurality of gaming machines; and a communications network arranged to facilitate communications to and from the gaming machines;

each gaming machine being arranged to implement a game, and to generate status information indicative of whether the gaming machine is vacant or occupied;

the system being arranged to display availability information derived from the status information indicative of whether at least some of the gaming machines are vacant or occupied.

In accordance with a eighth aspect of the present invention, there is provided a computer readable medium having computer readable program code embodied therein, the computer readable program code being arranged when loaded into a computer to cause the computer to operate in accordance with a gaming system comprising:

a plurality of gaming machines; and a communications network arranged to facilitate communications to and from the gaming machines;

each gaming machine being arranged to implement a game, and to generate status information indicative of whether the gaming machine is vacant or occupied;

the system being arranged to display availability information derived from the status information indicative of whether at least some of the gaming machines are vacant or occupied.

BRIEF DESCRIPTION OF SEVERAL VIEWS OF THE DRAWINGS

The present invention will now be described, by way of example only, with reference to the accompanying drawings, in which.

DETAILED DESCRIPTION OF THE INVENTION

Figure 1:
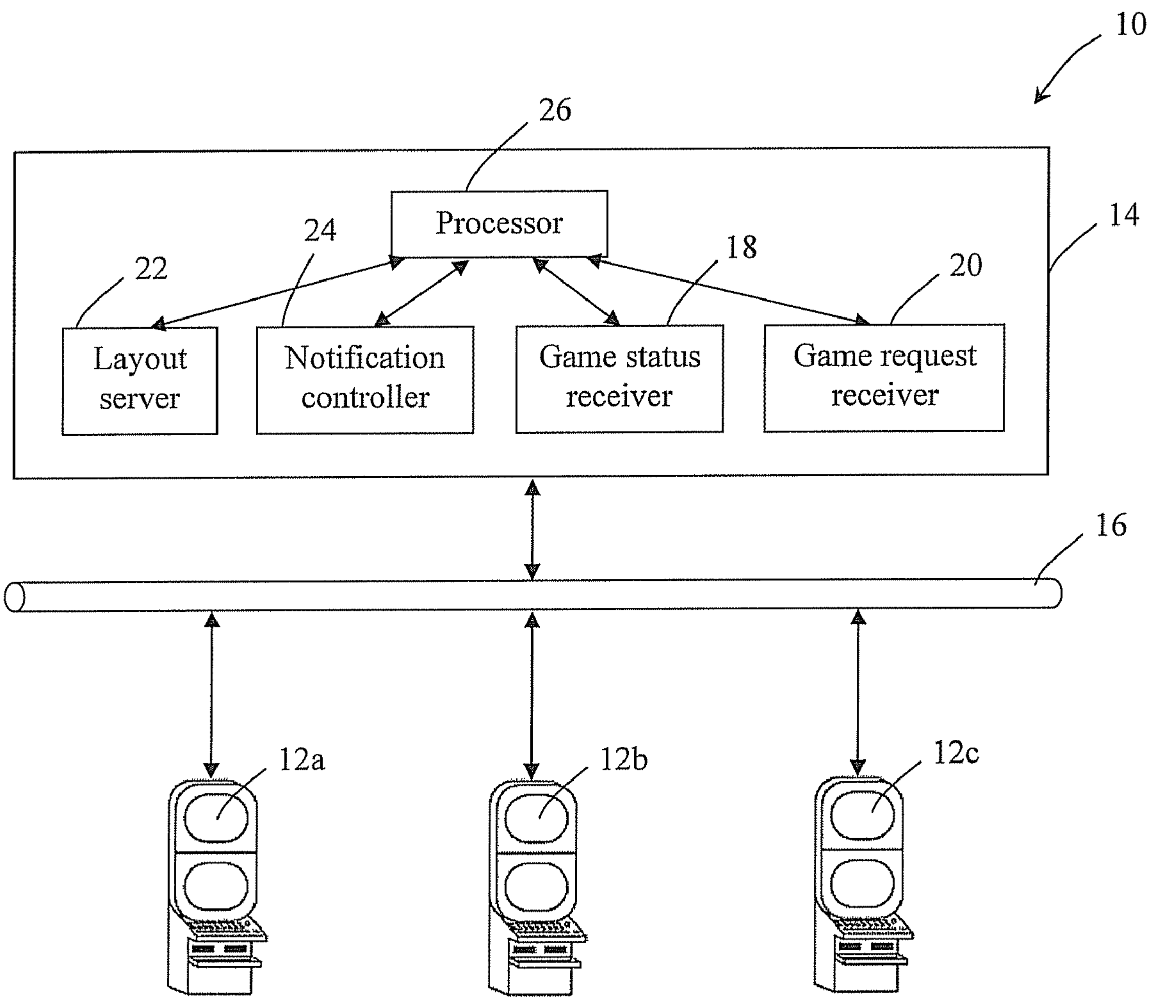
FIG. 1 is a schematic diagram of a gaming system in accordance with an embodiment of the present invention.

Referring to FIG. 1 of the drawings, there is shown a gaming system 10 including multiple player operable gaming machines 12, each of which in this example is arranged to implement a probabilistic wagering game of the type wherein a player wagers a bet amount, and a game outcome is determined in a probabilistic way. With some such probabilistic games, several symbols from a set of symbols are randomly displayed, and a game outcome is determined on the basis of the displayed symbols.

The gaming machines 12 communicate with a notification system 14 through a local network 16, the notification system 14 being arranged to gather status information from the gaming machines 12 indicative of whether the gaming machines are implementing a game, and to communicate the status information to the gaming machines 12 on request.

A game may be implemented by the gaming system in various ways.

In a first implementation, a stand alone gaming machine is provided wherein all or most components required for implementing the game are present in a player operable gaming machine.

In a second implementation, a distributed architecture is provided wherein some of the components required for implementing the game are present in a player operable gaming machine and some of the components required for implementing the base game are located remotely relative to the gaming machine.

For example, a “thick client” arrangement may be used wherein part of the game is executed on a gaming machine 12 and part of the game is executed by a gaming server, or a “thin client” arrangement may be used wherein most of the game is executed remotely by the gaming server and a gaming machine 12 is used only to display audible and/or visible gaming information to the player and receive gaming inputs from the player.

However, it will be understood that other arrangements are envisaged. For example, an architecture may be provided wherein the respective functions of the gaming machine 12 and the gaming server are selectively modifiable. For example, the gaming system may operate in stand alone gaming machine mode, “thick client” mode or “thin client” mode depending on the game being played, operating conditions, and so on. Other variations will be apparent to persons skilled in the art.

Operative components of the notification system 14 are shown in FIG. 1.

The notification system 14 includes a game status receiver 18 arranged to receive status information from each of the gaming machines 12 associated with the gaming system 12. The status information from each gaming machine 12 includes information indicative of whether the gaming machine 12 is implementing a game (occupied) or is available for game play (vacant), and information indicative of the game, the denomination associated with the game such as the minimum bet amount per line, and any other game related information.

The notification system 14 also includes a game request receiver 20 arranged to receive game request information from the gaming machines 12, the game request information including information indicative of the game desired to be played by a player and/or a particular gaming machine desired to be played by a player, and of the current gaming machine being played by the player.

The notification system 14 also includes a layout server 22 arranged to generate layout information indicative of the locations of at least some of the gaming machines 12 associated with a gaming venue, of the types of games implementable by the gaming machines 12, and of the availability of the gaming machines 12 for game play using the status information received at the game status receiver 18 from the gaining machines 12. The layout server 22 also communicates the layout information to the gaming machines through the network 16, for example when requested by a gaming machine 12 in response to player input. The layout information is used by the gaming machines 12 to generate a representation on a display of a gaming machine of a venue layout showing the locations of the gaming machines associated with the gaming system 10 in relation to the venue and relative to each other, the games implemented by the gaining machines, the denomination(s) appropriate for the gaming machines 12, and whether the gaming machine(s) are available to be played by a prospective player.

As an alternative to serving the layout information to the gaming machines for display at the gaming machines, the gaming system may be arranged so as to display the layout information at a display location separate to the gaming machines.

As an alternative to receiving game requests from gaming machines, the gaming system may be arranged to receive game requests from other devices, such as from a game request facility at the notification system 14 or at a kiosk located at the gaming venue, or from a communications enable mobile device such as a mobile phone associated with a player.

Using controls on a gaming machine 12 which may be buttons or a touch screen, a player is able to select a game which is currently unavailable and which is desired to be played by the player, and in this example the player is also able to select a specific gaming machine which is desired to be played. After selection of a game to be played, or a gaming machine to be played, a game request communication is sent from the gaming machine to the notification system 14 through the network 16. The game request communication is received by a game request receiver 20 which communicates with a notification controller 24, and using information provided by the game status receiver 18 the notification controller 24 determines when the requested game or gaming machine 12 becomes available. When the requested game or gaming machine 12 becomes available, the notification controller 24 sends a machine free notification to the relevant gaming machine associated with the game request, and based on receipt of the machine free notification the gaming machine displays an available message to the player to indicate that the desired game and/or gaming machine is now available.

As an alternative to sending a machine free notification to the relevant gaining machine associated with the game request, the machine free notification may be used at the notification system 14, sent to a dedicated player notification device located at the gaming venue, or sent to a mobile communications device such as a mobile phone associated with the player.

Irrespective of the destination of the machine free notification, a visible indication is generated to indicate to the requesting player that the requested game and/or gaming machine is available.

The gaming system 10 may be arranged such that after receipt of the machine free notification, the player has a predefined period of time in which to commence game play at the requested gaming machine 12, otherwise the gaming machine 12 becomes available to all prospective players.

In order to ensure that the requested game and/or requested gaming machine is reserved for use only by the requesting player, the player may be provided with an identifier which may be in the form of an alphanumeric code or may be in the form of a printed ticket, with the desired gaming machine being provided with the facility to accept the identifier, for example by providing the gaming machine with a keypad or ticket reader, and to validate the identifier in order to verify the validity of the prospective player. As a further alternative, the gaming machines may be arranged to receive data storage cards which are capable of storing identifiers together with other personal and/or game play related information specific to the players. On receipt of a valid identifier at the gaming machine within the allowed time period, the game is implemented.

In this example the layout server 22, the notification controller 24, the game request receiver 20, and the game status receiver 18 are implemented using a processor 26 and associated software (not shown), although it will be understood that other implementations are envisaged.

Figure 2:
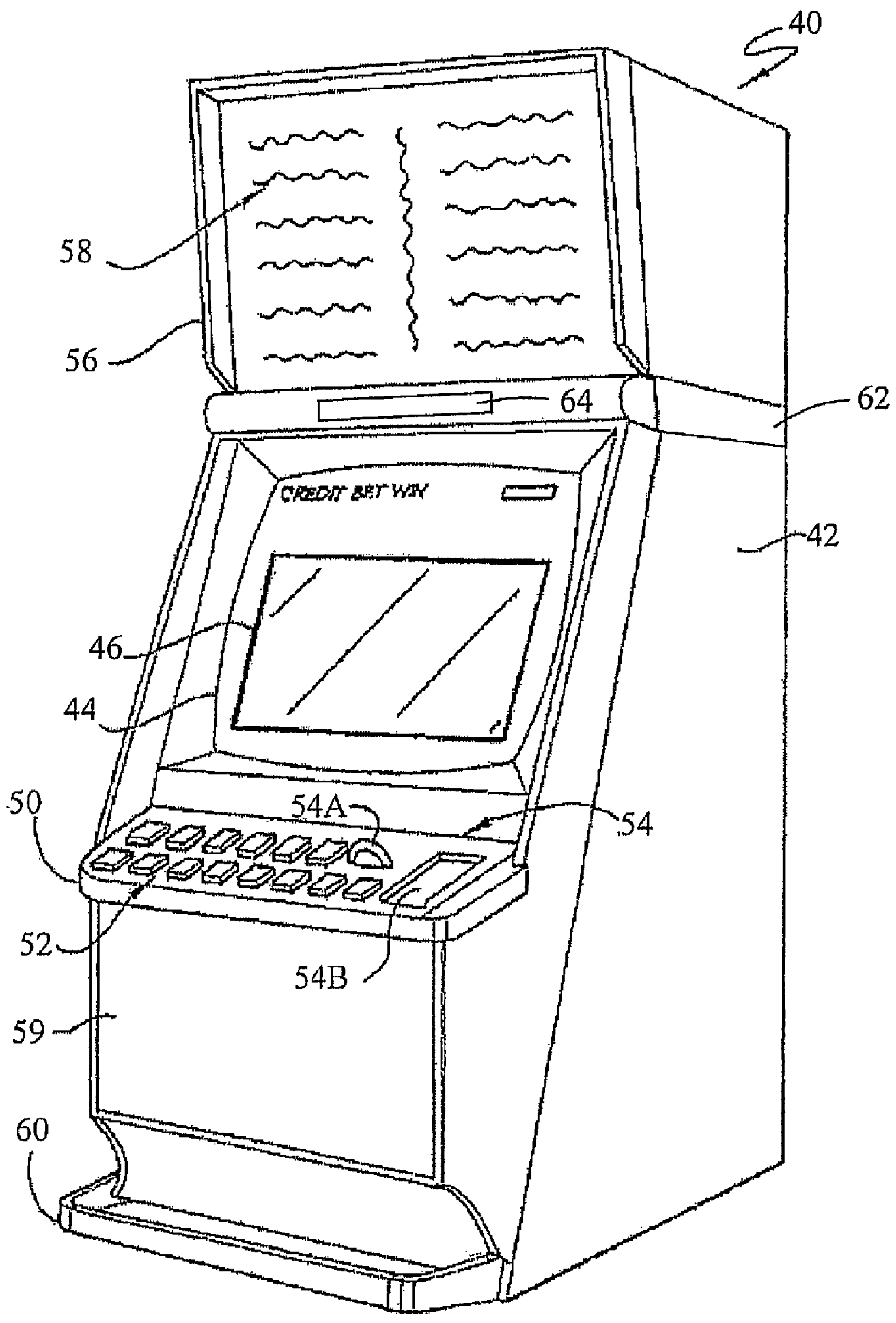
FIG. 2 is a diagrammatic representation of a gaming machine of the gaming system shown in FIG. 1.

A gaming machine 40 of stand alone type is illustrated in more detail in FIG. 2. The gaming machine 40 includes a console 42 having a display 44 on which is displayed representations of a game 46 that can be played by a player. A mid-trim 50 of the gaming machine 40 houses a bank of buttons 52 for enabling a player to interact with the gaming machine during game play, including enabling the player to select the bet amount. The mid-trim 50 also houses a credit input mechanism 54 which in this example includes a coin input chute 54A and a bill collector 54B. A reading device may also be provided for the purpose of reading a player tracking device, for example as part of a loyalty program. The player tracking device may be in the form of a card, flash drive or any other portable storage medium capable of being read by the reading device.

A top box 56 may carry artwork 58, including for example pay tables and details of bonus awards and other information or images relating to the game. Further artwork and/or information may be provided on a front panel 59 of the console 52. A coin tray 60 is mounted beneath the front panel 59 for dispensing cash payouts from the gaining machine 40.

The display 44 is in the form of a video display unit, particularly a cathode ray tube screen device. Alternatively, the display 44 may be a liquid crystal display, plasma screen, any other suitable video display unit. The top box 56 and/or the front panel 59 may also include a display, for example a video display unit, which may be of the same type as the display 44, or of a different type.

The display 44 may include a touch screen and the buttons 52 and/or the touch screen may be arranged such that a player is able to use the buttons 52 and/or the touch screen to cause the gaming machine layout to be shown on the display 44 and to select a game and/or a gaming machine which is desired to be played.

The top box 58, front panel 59 and/or the display 44 may further display advertising material which in this example is displayed in response to advertising data downloaded from an advertising server.

Figure 3:
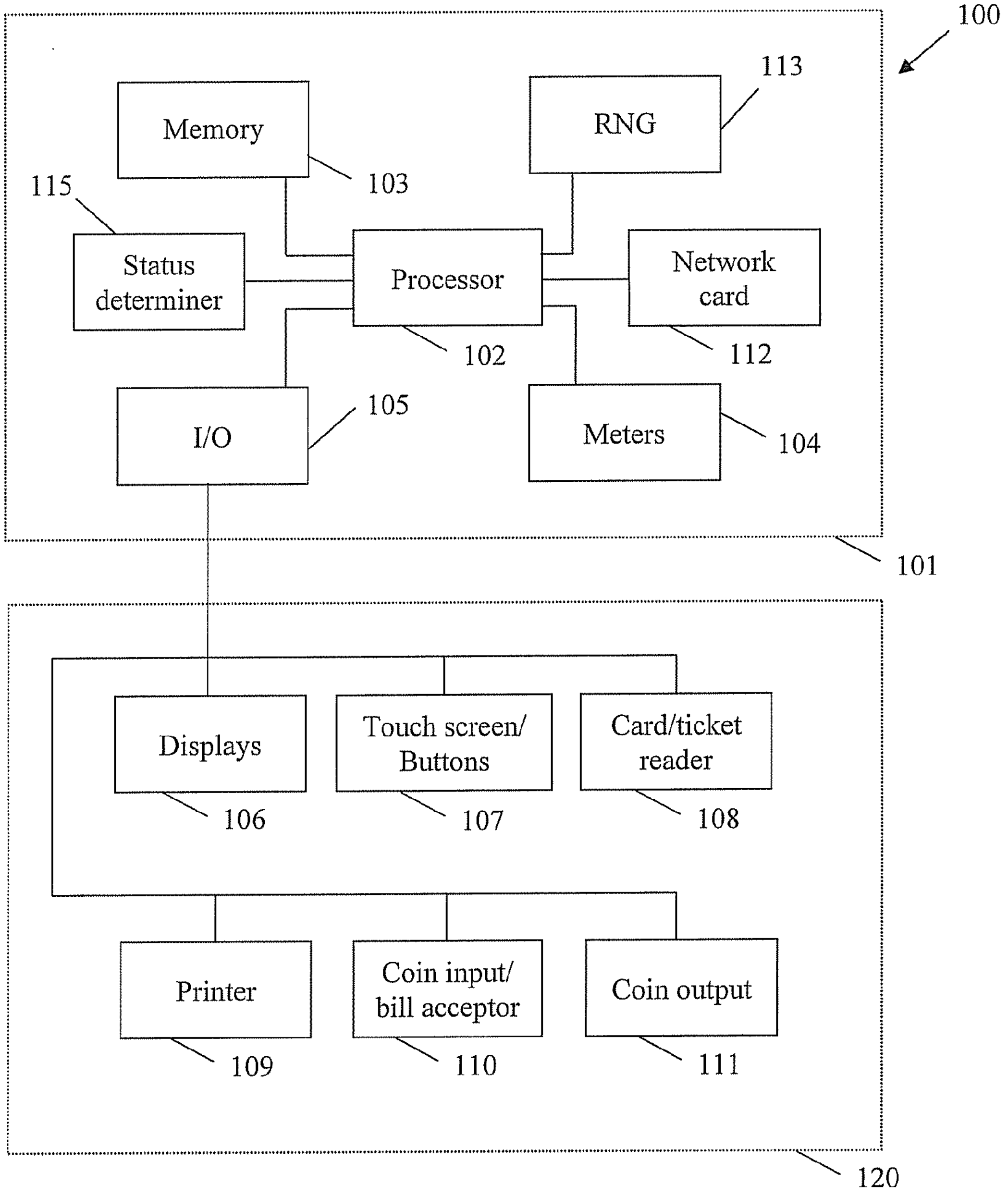
FIG. 3 is a schematic block diagram of operative components of the gaming machine shown in FIG. 2.

FIG. 3 shows a block diagram of operative components 100 of the gaming machine 40.

The operative components 100 include a game controller 102 and a player interface 120.

The game controller 101 comprises a processor 20 and a memory 103. Instructions and data to control operation of the processor 20 are stored in the memory 103. Typically, the gaming machine 40 will include both volatile and non-volatile memory and more than one of each type of memory, with such memories being collectively represented by the memory 103.

Figure 4:
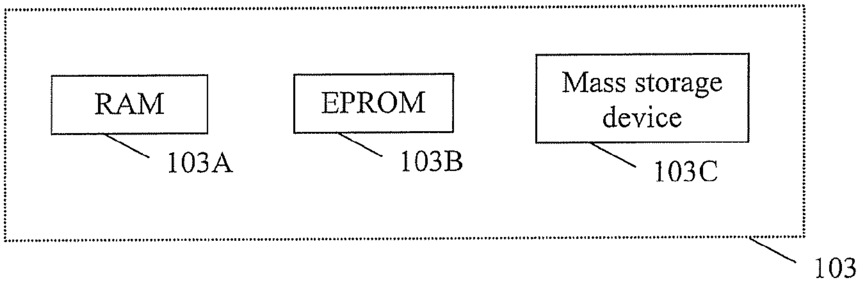
FIG. 4 is a schematic block diagram of components of a memory of the gaming machine shown in FIG. 2.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

The game controller 101 also includes meters 104 for purposes including ensuring regulatory compliance and monitoring player credit, and an input/output (I/O) interface 105 for communicating with a player interface 120.

In the example shown in FIG. 3, the player interface 120 includes the display 44, buttons 52 and the credit input mechanism 54, and also comprises a touch screen 107, a card and/or ticket reader 108 and a printer 109. Additional hardware may be included as part of the gaming machine 40, or hardware may be omitted as required for the specific implementation.

In addition, the game controller 101 includes a communications interface, for example a network card 112, which facilitates communications between the gaming machine 40 and the notification system 14 through the network 16, and a status determiner 115 arranged to determine whether a game is currently being implemented by the gaming machine 40 and to communicate status information to the notification system using the network card 112. In this example, the status information includes information indicative of whether the gaming machine 12 is implementing a game or is available, and also information indicative of the game(s) implementable by the gaming machine, and the denomination associated with the game such as the minimum bet amount per line.

Figure 5:
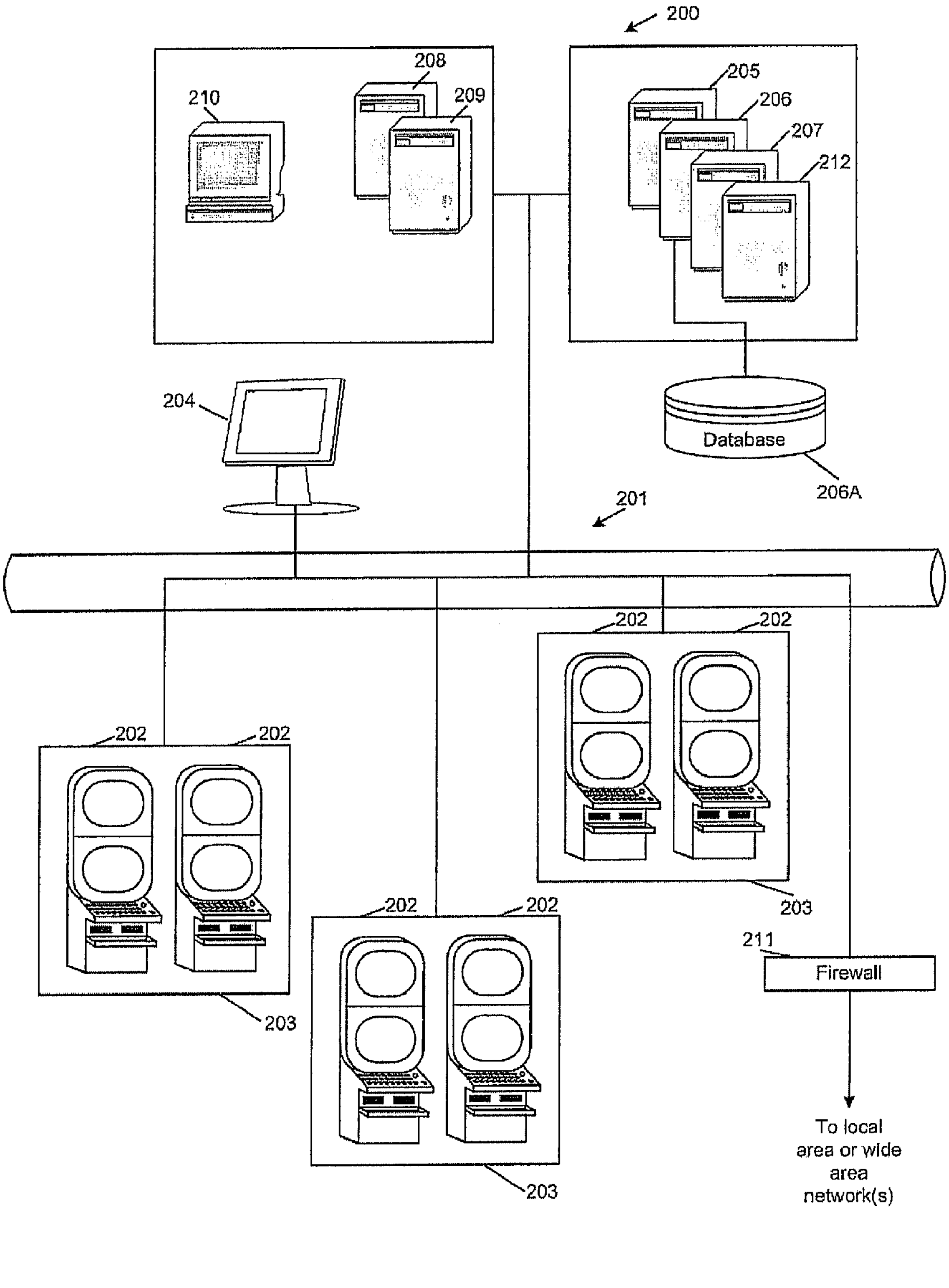
FIG. 5 is a schematic diagram of a gaming network including the gaming system shown in FIG. 1.

FIG. 5 shows a gaming network 200 in accordance with an alternative embodiment, the gaming network incorporating the gaming system and being arranged to implement games using a network architecture In this example, three banks 203 of two gaming machines 202 are connected to the network 201. The gaming machines 202 provide a player operable interface and may be the same as the gaming machines 40,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. The displays 204 may, for example, be associated with one or more banks 203 of gaming machines. The displays 204 may be used to display representations associated with game play on the gaming machines 202, and/or used to display other representations, for example promotional or informational material.

In a thick client embodiment, a game server 205 implements part of the game played by a player using a gaming machine 202 and the gaming machine 202 implements part of the game. With this embodiment, as both the game server 205 and the gaming machine 202 implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to monitor and carry out the Jackpot game.

In a variation of the above thick client embodiment, the gaming machine 202 may implement the game, with the game server 205 functioning merely to serve data indicative of a game to the gaming machine 202 for implementation.

With this implementation, a data signal containing a computer program usable by the client terminal to implement the gaming system may be transferred from the game server to the client terminal, for example in response to a request by the client terminal.

In a thin client embodiment, the game server 205 implements most or all of the game played by a player using a gaming machine 202 and the gaming machine 202 essentially provides only the player interface. With this embodiment, the game server 205 provides the game controller. The gaming machine will receive player instructions, and pass the instructions to the game server which will process them and return game play outcomes to the gaming machine for display. In a thin client embodiment, the gaining machines could be computer terminals, e.g. PCs running software that provides a player interface operable using standard computer input and output components.

Servers are also typically provided to assist in the administration of the gaming system 200, including for example a gaming floor management server 208 and a licensing server 209 to monitor the use of licenses relating to particular games. An administrator terminal 210 is provided to allow an administrator to monitor the network 201 and the devices connected to the network.

The gaming system 200 may communicate with other gaming systems, other local networks such as a corporate network, and/or a wide area network such as the Internet, for example through a firewall 211.

A loyalty program server 212 may also be provided.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random number generator engine. Alternatively, a separate random number generator server could be provided.

Figure 6:
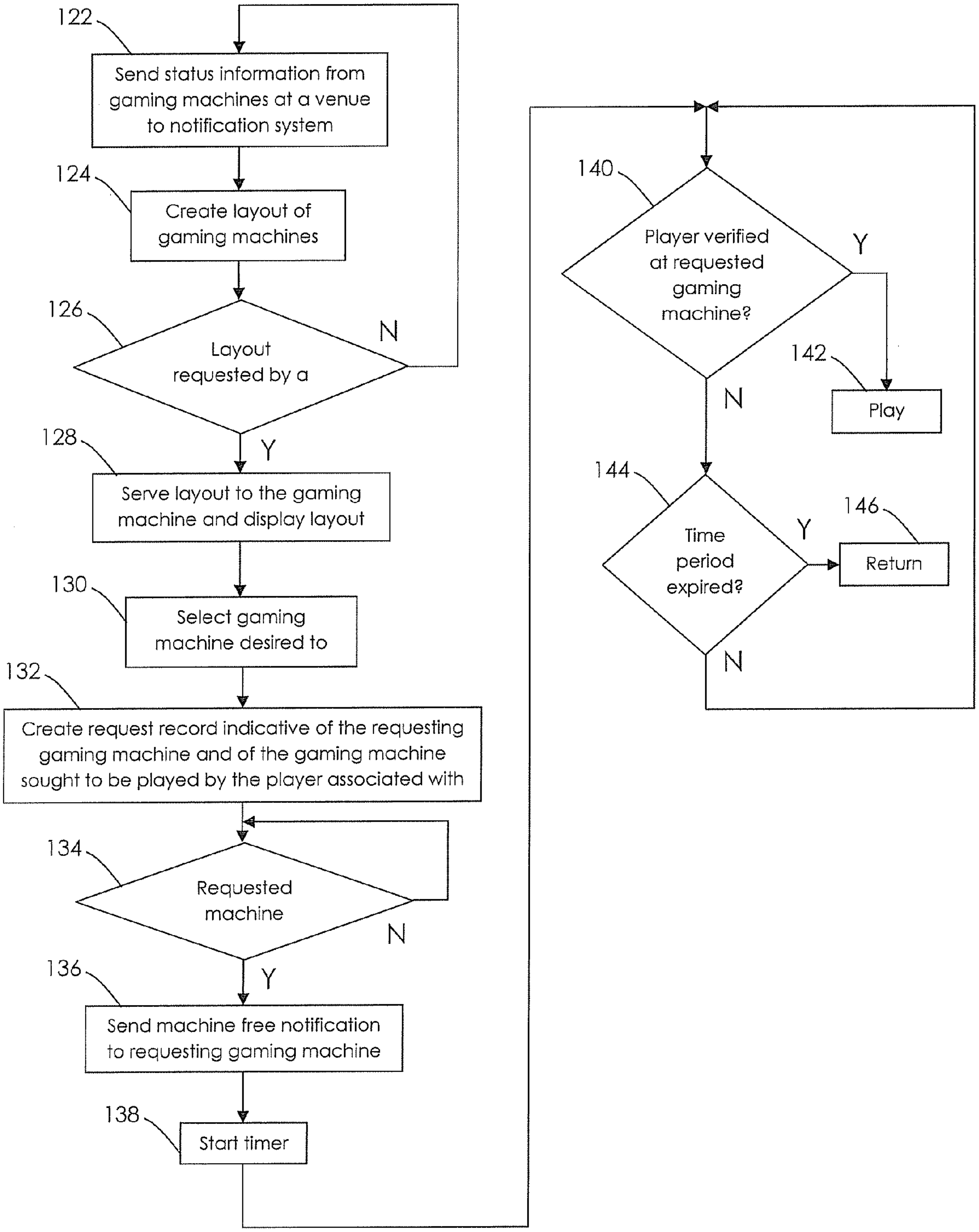
FIG. 6 is a flow diagram illustrating a method of managing usage of gaming machines in a gaming system in accordance with an embodiment of the present invention.
Figure 7:
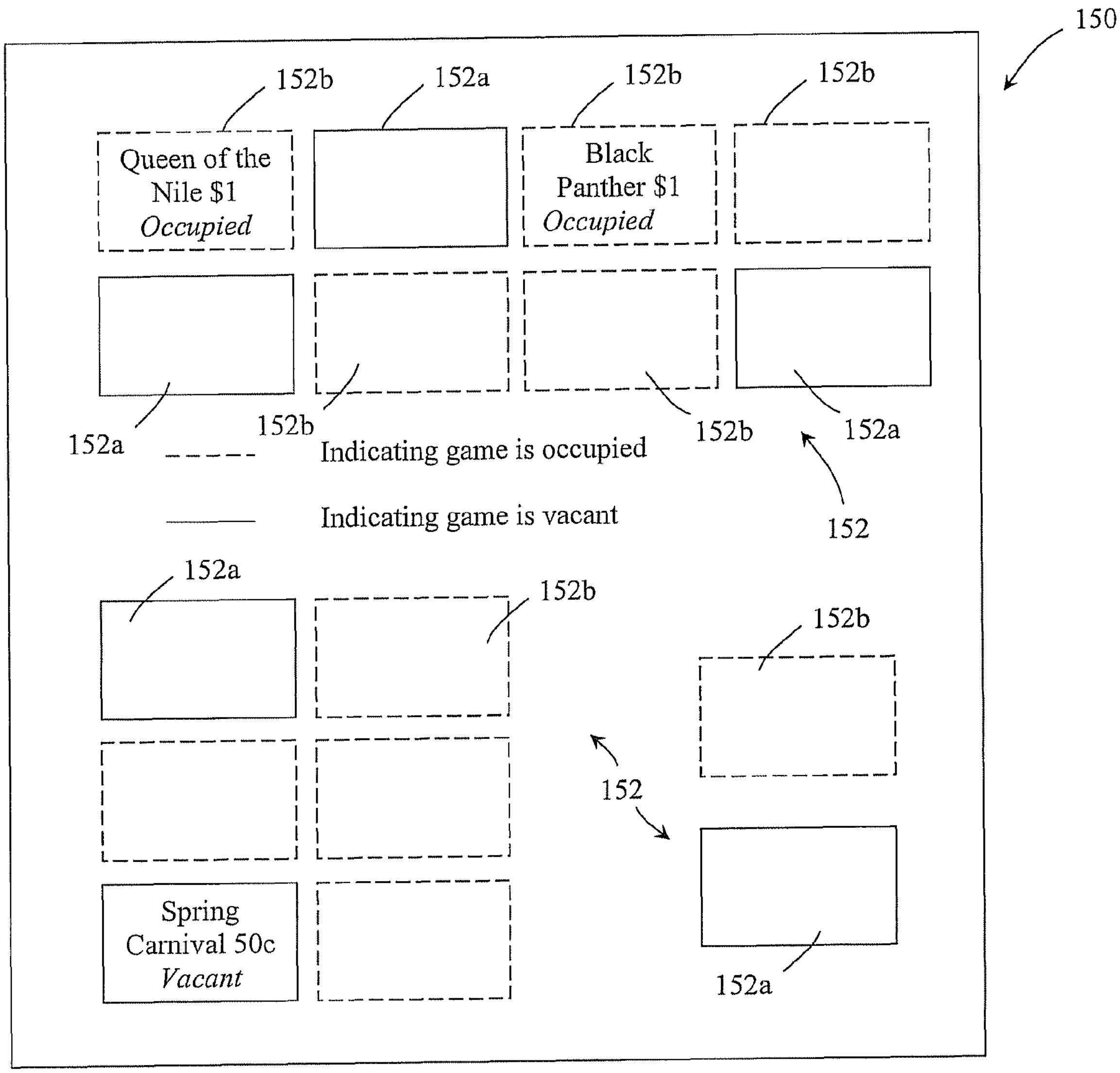
FIG. 7 is a schematic diagram of a gaming machine notification shown on a display of a gaming machine of the gaining system shown in FIG. 1.

Operation of an exemplary gaming system 10 will now be described with reference to the flow diagram 120 shown in FIG. 6 and the gaming machine layout shown in FIG. 7. The flow diagram 120 illustrates steps 122 to 146 carried out in a method of managing usage of gaming machines in accordance with an embodiment of the invention.

In the present example shown in FIG. 1, three gaming machines 12 are shown associated with the local network 16, although it will be understood that in practice more than three gaming machines 12 would typically be present.

Each gaming machine 12 implements a probabilistic game of the type wherein a player is able to place a bet and obtain a prize when the game results correspond to a winning outcome. In this example, a first gaming machine 12*a* is configured to implement a first game Queen of the Nile with a denomination of $1, a second gaming machine 12*b* is arranged to implement a game Black Panther with a denomination $1, and a third gaining machine 12*c* is arranged to implement a game Spring Carnival with a denomination 50*c*.

In this example, each of the games implemented by the gaming machines 12 is a spinning reel game of the type wherein several symbols from a set of symbols are randomly displayed, and a game outcome is determined on the basis of the displayed symbols. With such probabilistic games, the set of symbols may include standard symbols and function symbols, and the game outcome is determined on the basis of the displayed standard symbols and the function associated with any displayed function symbol. For example, standard symbols may resemble fruit such as apples, pears and bananas with a win outcome being determined when a predetermined number of the same fruit appear on a display in the same line, scattered, and so on. The function associated with a function symbol may be for example a wild function wherein display of the function symbol is treated during consideration of the game outcome as any of the standard symbols. A function symbol may be represented as the word "WILD", a star, or by any other suitable word or symbol. Other functions are also envisaged such as scatter functions, multiplier functions, repeat win functions, jackpot functions and feature commencement functions.

Using an appropriate button or using a touch screen on a gaming machine, a player is able to cause a layout 150 of gaming machines in the gaming venue to be displayed on the gaming machine display. An example gaining machine layout 150 is shown in FIG. 7.

The gaming machine layout 150 includes regions 152 associated with gaming machines, the locations of the regions relative to each other being representative of the locations of the gaming machines 12 relative to each other at the gaming venue. Each region 152 includes a description of the game, the denomination of the game associated with the region, and information indicative of whether the gaming machine is vacant or occupied. The regions may also be arranged so as to provide an additional readily recognizable indication as to whether the associated gaming machines are vacant or occupied, for example by displaying vacant gaming machine regions 152*a* in a first colour such as green, and displaying occupied gaming machine regions 152*b* in a second colour such as red, by flashing either the vacant gaming machine regions or the occupied gaming machine regions, or in any other way. In the example shown in FIG. 7, vacant gaming machines are indicated by representing the vacant gaming machine regions 152*a* with full lines and occupied gaming machines are indicated by representing the vacant gaming machine regions 152*b* with broken lines.

A player may use the gaming machine layout 150 to determine which gaming machines are vacant. If a desired gaming machine 12 is occupied or all gaming machines implementing a desired game are occupied, the player has the option of reserving a gaming machine by selecting the occupied gaming machine. In this example selection of a gaming machine may occur by touching the gaming machine display at the desired gaming machine region 152.

After selection of an occupied gaming machine, a gaming machine request communication is sent from the gaming machine to the notification system 14 which creates a request record including information indicative of the requesting gaming machine, of the requested gaming machine and an identifier usable to verify the identity of the player when the requested gaining machine becomes free.

The notification system 14 then monitors status information received from the gaming machines at the venue in order to monitor the gaining status of the requested gaining machine. When the requested gaming machine becomes available, a machine free notification is sent from the notification system 14 to the requesting gaming machine 12 and displayed on the requesting gaming machine to indicate to the player that the desired gaming machine is now available. When this occurs, a timer starts which determines an amount of time available for the player to finish the current game being played and commence a game at the requested gaming machine. In order to ensure that only the correct player is able to play the game on the requested gaming machine within the allowed time period, the player may be provided with an identifier, for example printed on a ticket. The identifier is communicated to the requested gaining machine, for example by introducing the ticket into the requested gaming machine within the allowed time period, and if the identifier matches the identifier stored in the respective request record, the requested gaming machine 12 is made available to the player to play a game. If the player does not commence the game at the requested gaming machine within the allowed time period, the reservation ceases and any prospective player is able to play a game on the requested gaming machine.

Figure 8:
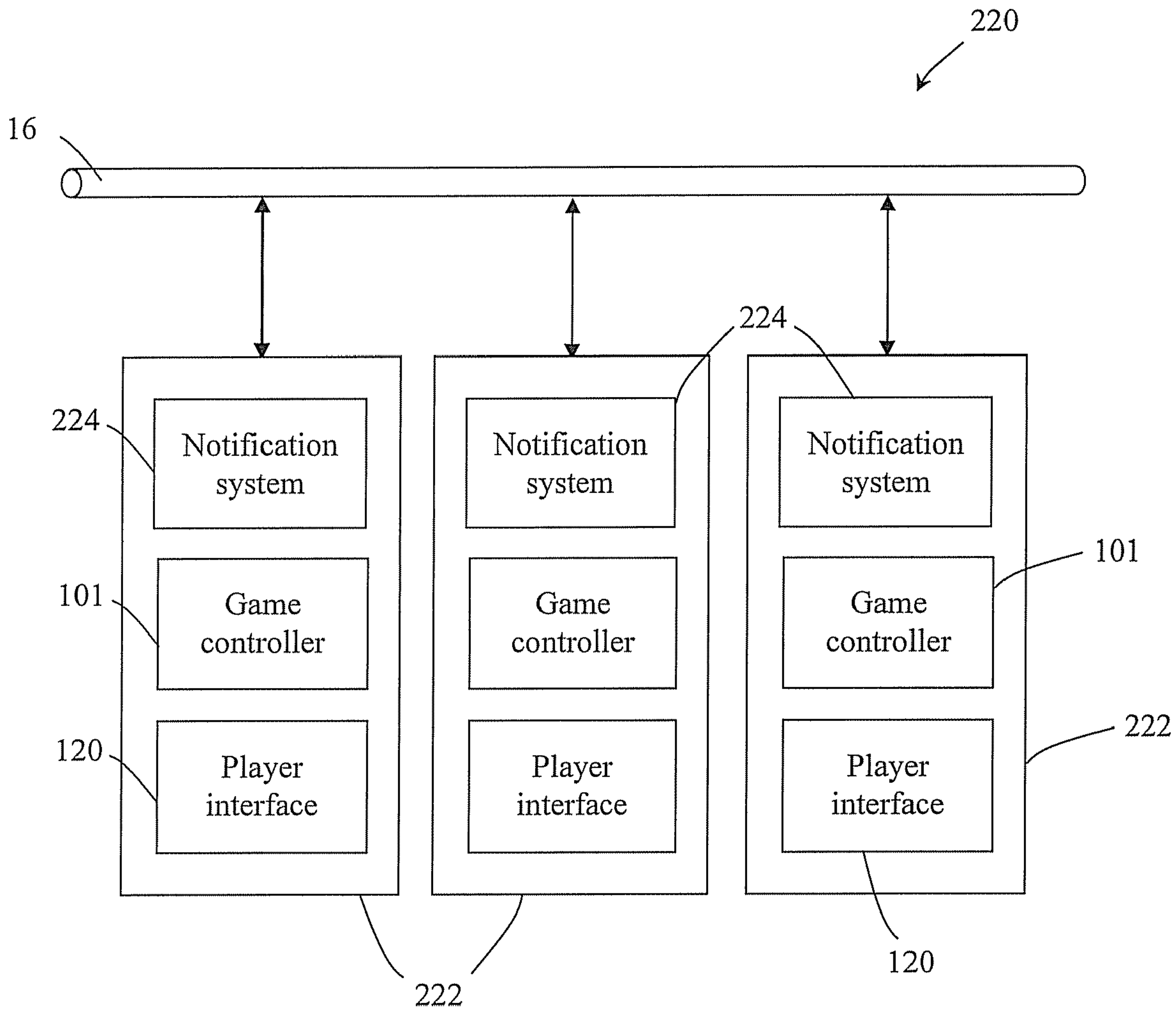
FIG. 8 is a schematic diagram of an alternative gaming system in accordance with an embodiment of the present invention.

While the above embodiments are described in relation to a gaming system including a notification system 14 in networked communication with a plurality of gaining machines 12 and arranged to gather status information from the gaming machines, disseminate the information to the gaming machines, and to facilitate reservation of desired gaming machines by players, it will be understood that other variations are possible. For example, as shown in FIG. 8, an alternative gaming system 220 is shown wherein each gaming machine 222 is arranged to communicate directly with other gaming machines 222 through the network 16, for example by providing each gaming machine 222 with a notification system 224 configured carry out functions similar to the functions carried to out by the notification system shown in FIG. 1. In particular, each notification system 224 may be arranged to generate a gaming machine layout 150 based on status information received directly from all other gaming machines, to send gaming machine requests directly to other gaming machines, and to receive notifications of availability directly from requested gaming machines. With this embodiment, the above functions may be carried out by a notification module connected to each gaming machine. The notification module may comprise a player marketing module (PMM) and/or a player tracking module (PTM).

In alternative arrangements using a server based architecture wherein a game is at least partly implemented at a central server, instead of arranging each gaming machine to provide status information indicative of whether the gaming machine is vacant or occupied, the system may be arranged such that the status information is generated by the central server.

Modifications and variations as would be apparent to a skilled addressee are deemed to be within the scope of the present invention.

The invention claimed is:

1. A gaming system comprising:

a plurality of gaming machines; and a communications network arranged to facilitate communications to and from the gaming machines;

each gaming machine being arranged to implement a game, and to generate status information indicative of whether the gaming machine is vacant or occupied;

the system being arranged to display availability information derived from the status information indicative of whether a desired gaming machine is vacant or occupied; and wherein if the desired gaming machine is occupied, a request is receivable from the player to reserve the desired gaming machine for future play by the player.

2. A gaming system as claimed in claim 1, wherein the availability information is received and displayed at a gaming machine.

3. A gaming system as claimed in claim 1, wherein the availability information is received and displayed at a display location separate to the gaming machines.

4. A gaming system as claimed in claim 1, wherein the gaming system is arranged to generate gaming machine layout information, the layout information being indicative of the locations of the gaming machines relative to each other.

5. A gaming system as claimed in claim 1, wherein the availability information is arranged so as to graphically indicate whether a gaming machine is vacant or occupied.

6. A gaming system as claimed in claim 1, wherein the game request is received in response to player selection of a gaming machine using the layout information.

7. A gaming system as claimed in claim 1, wherein each gaming machine is arranged to receive a game request from a player.

8. A gaming system as claimed in claim 1, wherein the gaming system is arranged to receive a game request using a game request device separate to the gaming machines.

9. A gaming system as claimed in claim 1, wherein the gaming system is arranged to receive a game request from a mobile communications device.

10. A gaming system as claimed in claim 1, wherein the gaming system is arranged to generate a machine free notification when the requested gaming machine is vacant using the status information generated by the requested gaming machine.

11. A gaming system as claimed in claim 1, and wherein the system is further arranged to reserve the desired gaming machine such that the reservation by the player ceases if the player does not commence game play at the requested gaming machine within a specific period of time.

12. A gaming system as claimed in claim 1, wherein each gaming machine is arranged to communicate directly with other gaming machines.

13. A gaming system as claimed in claim 1, wherein the gaming system comprises a notification system arranged to communicate with the gaming machines through the communications network, the notification system comprising a game status receiver arranged to receive status information from the gaming machines, and to communicate the status information to the gaming machines.

14. A gaming system as claimed in claim 4, wherein the layout information includes the availability information.

15. A gaming system as claimed in claim 4, wherein the layout information includes information indicative of the name of the or each of the games implementable by the gaming machines associated with the gaming system, and/or the denominations associated with the implementable games.

16. A gaming system as claimed in claim 5, wherein the availability information is arranged so as to graphically indicate whether a gaming machine is vacant or occupied by representing vacant gaming machines with a first colour and representing occupied gaming machines with a second colour.

17. A gaming system as claimed in claim 5, wherein the availability information is arranged so as to graphically indicate whether a gaming machine is vacant or occupied by causing representations of the occupied gaming machines or the vacant gaming machines to flash.

18. A gaming system as claimed in claim 9, wherein the mobile communications device is a mobile phone.

19. A gaming system as claimed in claim 10, wherein information indicative of the machine free notification is communicated to the player at a gaming machine.

20. A gaming system as claimed in claim 10, wherein information indicative of the machine free notification is communicated to the player by displaying the information at a display location separate to the gaming machines.

21. A gaming system as claimed in claim 10, wherein information indicative of the machine free notification is communicated to the player by sending the information to a mobile communications device associated with the player.

22. A gaming system as claimed in claim 21, wherein the mobile communications device is a mobile phone.

23. A gaming system as claimed in claim 11, wherein the gaming system is arranged to generate an identifier when a machine free notification is generated, the identifier being usable by a requested gaming machine to identify the player associated with the game request and thereby make a requested gaming machine available for game play.

24. A gaming system as claimed in claim 23, wherein the identifier is communicated to a player by displaying the identifier on a screen.

25. A gaming system as claimed in claim 23, wherein the identifier is stored on a storage medium readable by the requested gaming machine.

26. A gaming system as claimed in claim 23, wherein the identifier is incorporated into or on a ticket readable by the requested gaming machine.

27. A gaming system as claimed in claim 12, wherein each gaming machine has an associated notification module arranged to receive status information from the gaming machines, and to communicate the status information to the other gaming machines.

28. A gaming system as claimed in claim 13, wherein the notification system comprises a layout server arranged to generate layout information indicative of the locations of the gaming machines relative to each other, the availability information, and information indicative of the name of the or each of the games implementable by the gaming machines associated with the gaming system, and/or the denominations associated with the implementable games.

29. A gaming system as claimed in claim 13, wherein the notification system comprises a game request receiver arranged to receive game request information from the gaming machines indicative of a game desired to be played by a player and/or a particular gaming machine desired to be played by a player, and a notification controller arranged to send a machine free notification to a gaming machine associated with the game request to the gaming machine.

30. A method of managing usage of gaming machines, the method comprising:

providing a plurality of gaming machines; and enabling communications to and from the gaming machines;

arranging each gaming machine to generate status information indicative of whether the gaming machine is vacant or occupied; and receiving availability information derived from the status information indicative of whether a desired the gaming machine is vacant or occupied; and wherein if the desired gaming machine is occupied, a request is receivable from the player to reserve the desired gaming machine for future play by the player.

31. A method as claimed in claim 30, comprising receiving and displaying the availability information at a gaming machine.

32. A method as claimed in claim 30, comprising receiving and displaying the availability information at a display location separate to the gaming machines.

33. A method as claimed in claim 30, comprising generating gaming machine layout information, the layout information being indicative of the locations of the gaming machines relative to each other.

34. A method as claimed in claim 30, graphically indicating in the availability information whether a gaming machine is vacant or occupied.

35. A method as claimed in claim 30, comprising receiving a game request in response to player selection of a gaming machine using the layout information.

36. A method as claimed in claim 30, comprising receiving a game request from a gaming machine.

37. A method as claimed in claim 30, comprising receiving a game request from a game request device separate to the gaming machines.

38. A method as claimed in claim 30, comprising receiving a game request from a mobile communications device.

39. A method as claimed in claim 30, comprising generating a machine free notification when the requested gaming machine is vacant using the status information generated by the requested gaming machine.

40. A method as claimed in claim 30, and comprising reserving the desired gaming machine, and ceasing the reservation by the player if the player does not commence game play at the desired gaming machine within a specific period of time.

41. A method as claimed in claim 33, wherein the layout information includes the availability information.

42. A method as claimed in claim 33, wherein the layout information includes information indicative of the name of the or each of the games implementable by the gaming machines associated with the method, and/or the denominations associated with the implementable games.

43. A method as claimed in claim 34, comprising representing vacant gaming machines with a first colour and representing occupied gaming machines with a second colour.

44. A method as claimed in claim 34, comprising causing representations of the occupied gaming machines or the vacant gaming machines to flash.

45. A method as claimed in claim 38, comprising receiving a game request from a mobile phone.

46. A method as claimed in claim 39, comprising communicating information indicative of the machine free notification to the player at a gaming machine.

47. A method as claimed in claim 39, comprising communicating information indicative of the machine free notification by displaying the information at a display location separate to the gaming machines.

48. A method as claimed in claim 39, comprising communicating information indicative of the machine free notification to the player by sending the information to a mobile communications device associated with the player.

49. A method as claimed in claim 48, wherein the mobile communications device is a mobile phone.

50. A method as claimed in claim 40, comprising generating an identifier when a machine free notification is generated, the identifier being usable by a requested gaming machine to identify the player associated with the game request and thereby make a requested gaming machine available for game play.

51. A method as claimed in claim 50, comprising communicating the identifier to a player by displaying the identifier on a screen.

52. A method as claimed in claim 50, comprising storing the identifier on a storage medium readable by the requested gaming machine.

53. A method as claimed in claim 50, comprising incorporating the identifier into or on a ticket readable by the requested gaming machine.

54. A gaming system comprising:

a plurality of gaming machines, wherein each gaming machine is arranged to generate status information indicative of whether the gaming machine is vacant or occupied;

a game server arranged to cooperate with each gaming machine so as to implement a game; and a communications network arranged to facilitate communications between the gaming machines and the game server;

the game server being arranged to generate status information indicative of whether the gaming machines are vacant or occupied; and the system being arranged to display availability information derived from the status information indicative of whether a desired gaming machine is vacant or occupied; and wherein if the desired gaming machine is occupied, a request is receivable from the player to reserve the desired gaming machine for future play by the player.

55. A gaming system as claimed in claim 54, wherein the availability information is received and displayed at a gaming machine.

56. A gaming system as claimed in claim 54, wherein the availability information is received and displayed at a display location separate to the gaming machines.

57. A gaming system as claimed in claim 54, wherein the gaming system is arranged to generate gaming machine layout information, the layout information being indicative of the locations of the gaming machines relative to each other.

58. A gaming system as claimed in claim 54, wherein the availability information is arranged so as to graphically indicate whether a gaming machine is vacant or occupied.

59. A gaming system as claimed in claim 54, wherein the game request is received in response to player selection of a gaming machine using the layout information.

60. A gaming system as claimed in claim 54, wherein each gaming machine is arranged to receive a game request from a player.

61. A gaming system as claimed in claim 54, wherein the gaming system is arranged to receive a game request using a game request device separate to the gaming machines.

62. A gaming system as claimed in claim 54, wherein the gaming system is arranged to receive a game request from a mobile communications device.

63. A gaming system as claimed in claim 54, wherein the gaming system is arranged to generate a machine free notification when the requested gaming machine is vacant using the status information.

64. A gaming system as claimed in claim 54, wherein the system is further arranged to reserve the desired gaming machine such that the reservation by the player ceases if the player does not commence game play at the requested gaming machine within a specific period of time.

65. A gaming system as claimed in claim 57, wherein the layout information includes the availability information.

66. A gaming system as claimed in claim 63, wherein information indicative of the machine free notification is communicated to the player at a gaming machine.

67. A gaming system as claimed in claim 63, wherein information indicative of the machine free notification is communicated to the player by displaying the information at a display location separate to the gaming machines.

68. A gaming system as claimed in claim 63, wherein information indicative of the machine free notification is communicated to the player by sending the information to a mobile communications device associated with the player.

* * * * *